United States Patent [19]
Haddock

[11] 3,761,508
[45] Sept. 25, 1973

[54] HERBICIDAL ALANINE DERIVATIVES
[75] Inventor: Ernest Haddock, Sheppey, England
[73] Assignee: Shell Oil Company, New York, N.Y.
[22] Filed: Feb. 25, 1971
[21] Appl. No.: 118,986

[30] Foreign Application Priority Data
Mar. 4, 1970 Great Britain .................. 10,375/70

[52] U.S. Cl. ................ 260/471 A, 71/111, 71/115, 260/518 A
[51] Int. Cl. ......................................... C07c 103/30
[58] Field of Search ..................... 260/471 A, 518 A

[56] References Cited
UNITED STATES PATENTS
3,661,975   5/1972   Korver .......................... 260/471 A Primary Examiner—Lorraine A. Weinberger
Assistant Examiner—L. Arnold Thaxton
Attorney—Frank R. La Fontaine and Marion W. Western

[57] ABSTRACT

N,N-disubstituted alanine derivatives of the formula

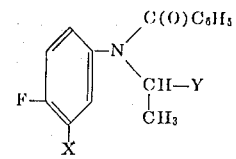

wherein X is H or Cl and Y represents a carboxyl group or the salts or alkyl esters thereof, and compositions containing them are useful for controlling undesirable plant growth.

British Patent No. 1,164,160 describes and claims novel amino acid derivatives of the formula:

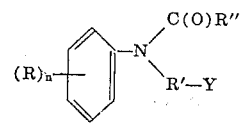

wherein R represents a halogen atom, preferably a chlorine atom, or an alkyl or alkoxy group; $n$ represents 0 or an integer from 1-5, and when $n$ is greater than 1 each R group may be the same or different; R' represents an alkylene group, preferably an ethylidene group; R'' represents an alkyl, alkoxy, aryl or an aryloxyalkylene group; and Y represents a carboxy group or salts or esters thereof, or a carbamoyl group optionally mono- or di-N-substituted. The derivatives N-benzoyl-N-(3,4-dichlorophenyl) alanine and its ethyl ester are named as particularly preferred compounds by reason of their selective herbicidal action in controlling the growth of wild oats.

5 Claims, No Drawings

HERBICIDAL ALANINE DERIVATIVES

It has been found, and forms the subject of the present invention, that certain alanine derivatives falling within the broad scope of the above general formula, but not specifically disclosed in the patent exhibit selective herbicidal properties against wild oats superior to those of the compounds disclosed in the patent.

Accordingly the present invention provides N,N-disubstituted alanine derivatives of the formula:

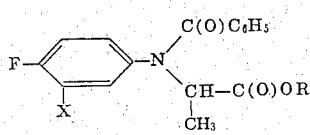

wherein X represents a hydrogen or chlorine atom; and R represents a hydrogen atom, an alkali metal atom or a $C_1$-$C_{10}$ alkyl group and preferably a $C_1$-$C_4$ alkyl group.

Preferred compounds are the ethyl esters of N-benzoyl-N-(4-fluorophenyl) alanine and N-benzoyl-N-(3-chloro-4-fluorophenyl) alanine.

The compounds wherein Y represents a carbalkoxy group may be prepared by reacting a mono-N-substituted alanine derivative of formula:

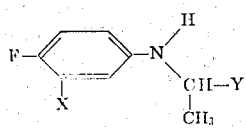

with a benzoyl halide, suitable benzoyl chloride. The reaction is preferably carried out in a hydrocarbon solvent, such as toluene. Those compounds wherein Y represents a carboxyl group may be obtained from the corresponding alkyl ester by conventional saponification and the corresponding salts may be obtained for example by neutralization of the carboxyl group using a suitable base.

The compounds of the invention may be used in the manner known for herbicides, that is to say they may be used alone or together with a suitable carrier and/or surface-active agent. The invention therefore includes herbicidal compositions comprising a compound of the invention and a carrier or a surface-active agent or both a carrier and a surface-active agent. Likewise the invention includes also a method of combating the growth of wild oats at locus by applying to the locus a compound or composition of the invention.

The term "carrier" as used herein means a material, which may be inorganic or organic and of synthetic or natural origin, with which the active compound is mixed or formulated to facilitate its application to the plant, seed, soil or other object to be treated, or its storage, transport or handling. The carrier may be a solid or a fluid. Any of the material usually applied in formulating herbicides may be used as carrier.

Suitable solid carriers are natural and synthetic clays and silicates, for example natural silicas such as diatomacious earths; magnesium silicates, for example, talcs; magnesium aluminum silicates, for example, attapulgites and vermiculites; aluminum silicates, for example, kaolinites, montmorillinites and micas; calcium carbonates; calcium sulphate; synthetic hydrated silicon oxides and synthetic calcium or aluminum silicates; elements such as for example, carbon and sulphur; natural and synthetic resins such as for example, coumarone resins, polyvinyl chloride and styrene polymers and copolymers; solid polychlorphenols; bitumen; waxes such as for example, beeswax, paraffin wax, and chlorinated mineral waxes; and solid fertilizers, for example superphosphates.

Examples of suitable fluid carriers are water, alcohols, such as for example, isopropanol, glycols; ketones such as for example, acetone, methyl ethyl ketone, methyl isobutyl ketone and cyclohexanone; ethers; aromatic hydrocarbons such as for example, benzene, toluene and xylene; petroleum fractions such as for example, kerosine, light mineral oils, chlorinated hydrocarbons, such as for example, carbon tetrachloride, perchloroethylene, trichloroethane, including liquefied normally vaporous gaseous compounds. Mixtures of different liquids are often suitable.

The surface-active agent may be an emulsifying agent or a dispersing agent or a wetting agent; it may be nonionic or ionic. Any of the surface-active agents usually applied in formulating herbicides or insecticides may be used. Examples of suitable surface-active agents are the sodium or calcium salts of polyacrylic acids and lignin sulphonic acids; the condensation products of fatty acids or aliphatic amines or amides containing at least 12 carbon atoms in the molecule with ethylene oxide and/or propylene oxide; fatty acid esters of glycerol, sorbitan, sucrose or pentaerythritol; condensates of these with ethylene oxide and/or propylene oxide; condensation products of fatty alcohols or alkyl phenols for example p-octylphenol or p-octylcresol, with ethylene oxide and/or propylene oxide; sulphates or sulphonates of these condensation products; alkali or alkaline earth metal salts, preferably sodium salts, of sulph-uric or sulphonic acid esters containing at least 10 carbon atoms in the molecule, for example, sodium lauryl sulphate, sodium secondary alkyl sulphates, sodium salts of sulphonated castor oil, and sodium alkylaryl sulphonates such as sodium dodecylbenzene sulphonate; and polymers of ethylene oxide and copolymers of ethylene oxide and propylene oxide.

The compositions of the invention may be formulated as wettable powders, dusts, granules, solutions, emulsifiable concentrates, emulsions, suspension concentrates and aerosols. Wettable powders are usually compounds to contain 25, 50 or 75% w of toxicant and usually contain, in addition to solid carrier, 3–10% w of a dispersing agent and, where necessary, 0–10% w of stabilizer(s) and/or other additives such as penetrants or stickers. Dusts are usually formulated as a dust concentrate having a similar composition to that of a wettable powder but without a dispersant, and are diluted in the field with further solid carrier to give a composition usually containing 0.5–10% w of toxicant. Granules are usually prepared to have a size between 10 and 100 BS mesh, and may be manufactured by agglomeration or impregnation techniques. Generally, granules will contain 0.5–25% w toxicant and 0–10% w or additives such as stabilizers, slow-release modifiers and binding agents. Emulsifiable concentrates usually contain, in addition to the solvent and, when necessary, co-solvent, 10–50% w/v toxicant, 2–20% w/v emulsifiers and 0–20% w/v of appropriate additives such as stabilizers, penetrants and corrosion inhibitors. Suspension concentrates are compounded so as to obtain a stable, non-sedimenting, flowable product and usually contain 10–75% w toxicant, 0.5–15% w of dispersing agents, 0.1–10% w of suspending agents such as protective colloids and thixotropic agents, 0–10% w of appropriate additives such as defoamers, corrosion inhibitors, stabilizers, penetrants and stickers, and as carrier, water or an organic liquid in which the toxicant is substantially insoluble; certain organic solids or inorganic salts may be dissolved in the carrier to assist in preventing sedimentation or as antifreeze agents for water.

The compositions of the invention may contain other ingredients, for example, protective colloids such as gelatin, glue, casein, gums, cellulose ethers, and polyvinyl alcohol; thixotropic agents e.g. bentonites, sodium polyphosphates; stabilizers such as ethylene diamine tetra-acetic acid, urea, triphenyl phosphate; other herbicides or pesticides; and stickers, for example non-volatile oils.

Aqueous dispersion and emulsions, for example, compositions obtained by diluting a wettable powder or an emulsifiable concentrate according to the invention with water, also lie within the scope of the present invention. The said emulsions may be of the water-in-oil or of the oil-in-water type, and may have a thick "mayonnaise"-like consistency.

The amount of active ingredient necessary to kill or inhibit the growth of plants is defined as the herbicidal amount. This quantity will obviously vary with the individual compound used, the plant species, type of formulation, environmental conditions and the like. Those versed in the herbicide field, however, can readily determine the effective amount for a particular set of conditions.

EXAMPLE I

N-benzoyl-N-(4-fluorophenyl) alanine, ethyl ester

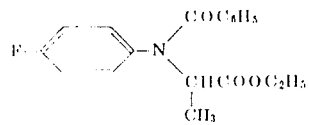

N-(4-fluorophenyl) alanine, ethyl ester (4.22 g) and benzoyl chloride (2.81 g) in dry toluene (50 ml) were heated together under reflux for 6 hours. The solvent was then removed under reduced pressure and the residue purified by chromatography on alumina using a 1:2 mixture of benzene and hexane as eluant to yield the desired product as a pale yellow oil.

ANALYSIS
Calculated for $C_{18}H_{18}NO_3F$: C, 68.6; H, 5.7; N, 4.4%
Found: C, 68.3; H, 6.0; N, 4.2%

EXAMPLE II

N-benzoyl-N-(3-chloro-4-fluoro phenyl) alanine, ethyl ester

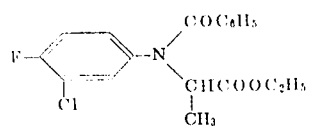

N-(3-chloro-4-fluoro phenyl) alanine, ethyl ester (2.46 g) and benzoyl chloride (1.4 g) in dry toluene (50 ml) were heated together under reflux for 20 hours. The solvent was then removed under reduced pressure and the residue purified by chromatography on alumina using benzene as eluant to yeild the desired product as a white crystalline solid having a m.p. of 86°–88°C.

ANALYSIS
Calculated for $C_{18}H_{17}NO_3ClF$: C, 61.8; H, 4.9; N, 4.0%
Found: C, 61.9; H, 5.0; N, 4.0%

EXAMPLE 3

Herbicidal Activity

To evaluate their herbicidal activity, the compounds of the invention were tested using as a representative range of plants: maize, *Zea mays* (Mz); oat, *Avena sativa* (O); rye grass, *Lolium perenne* (RG); pea, *Pisum sativum* (P); linseed, *Linum usitatissium* (L); mustard, *Sinapis alba* (M); and sugar beet, *Beta vulgaris* (SB).

The test fall into two categories, pre-emergence and post-emergence. The pre-emergence tests involved spraying a liquid formulation of the compound onto the soil in which the seeds of the plant species mentioned above had recently been sown. The post-emergence tests involved two types of test, viz. soil drench and foliar spray tests. In the soil drench tests the soil in which seedling plants of the above species were growing, was drenched with a liquid formulation containing a compound of the invention, and in the foliar spray tests the seedling plants were sprayed with such a formulation.

The soil used in the tests was a steam-sterilized, modified John Innes Compost mixture in which half the peat, by loose bulk, had been replaced by vermiculite.

The formulations used in the tests were prepared by diluting with water and solutions of the compounds in acetone containing 0.4% by weight of an alkylphenol-/ethylene oxide condensate under the trade name Triton X-155. In the soil spray and foliar spray tests the acetone solutions were diluted with an equal volume of water and the resulting formulations applied at two dosage levels corresponding to 10 and 1 kilograms of active material per hectare respectively in a volume equivalent to 400 liters per hectare. In the soil drench tests one volume of the acetone solution was diluted to 155 volumes with water and the resulting formulation applied at one dosage level equivalent to 10 kilograms of active material per hectare in a volume equivalent to approximately 3,000 liters per hectare.

In the pre-emergence tests untreated sown soil and in the post-emergence tests untreated soil bearing seedling plants were used as controls.

The herbicidal effects of the compounds were assessed visually seven days after spraying the foliage and drenching the soil and eleven days after spraying the soil, and were recorded on a 0–9 scale. A rating 0 indicates no effect on the treated plants, a rating 2 indicates a reduction in fresh weight of stem and leaf of the plants of approximately 25%, a rating 5 indicates a reduction of approximately 55%, a rating 9 indicates a reduction of 95% etc.

TABLE I

| Compound | Dosage kg./ha. | Post-emergence (plants) Soil drench | | | | | | | Dosage kg./ha. | Foliar spray | | | | | | | Pre-emergence (seeds) Soil spray | | | | | | |
|---|---|---|---|---|---|---|---|---|---|---|---|---|---|---|---|---|---|---|---|---|---|---|---|
| | | Mz | O | RG | P | L | M | SB | | Mz | O | RG | P | L | M | SB | Mz | O | RS | P | L | M | SB |
| N-benzoyl-N-(3,4-dichlorophenyl)-alanine, ethyl ester | 10 | 0 | 5 | 0 | 0 | 0 | 0 | 0 | 10 | 0 | 4 | 0 | 0 | 2 | 2 | 2 | 0 | 6 | 0 | 0 | 3 | 1 | 0 |
| | | | | | | | | | 1 | | 4 | | | 0 | 0 | 0 | | 2 | | | 0 | 0 | |
| N-benzoyl-N-(4-fluorophenyl)-alanine, ethyl ester | 10 | 0 | 5 | 0 | 0 | 0 | 0 | 0 | 10 | 0 | 5 | 4 | 0 | 6 | 7 | 8 | 0 | 8 | 0 | 5 | 5 | 6 | 3 |
| | | | | | | | | | 1 | | 4 | 0 | | 0 | 2 | 0 | | 4 | | 0 | 0 | 0 | 0 |
| N-benzoyl-N-(3-chloro-4-fluorophenyl) alanine, ethyl ester | 10 | 0 | 4 | 0 | | 0 | 2 | 0 | 10 | 0 | 4 | 1 | | 7 | 9 | 6 | 0 | 8 | 0 | 0 | 0 | 6 | 4 |
| | | | | | | | | | 1 | | 4 | 0 | | 0 | 2 | 1 | | 7 | | | | 0 | 0 |

I claim as my invention:

1. A compound of the formula

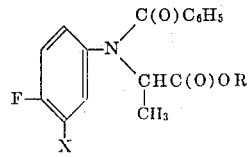

wherein X is H or Cl and R is $C_1$–$C_{10}$ alkyl.

2. A compound according to claim 1 wherein R is $C_1$–$C_4$ alkyl.

3. A compound according to claim 2 wherein R is ethyl.

4. A compound according to claim 3 wherein X is H.

5. A compound according to claim 3 wherein X is Cl.

* * * * *